UNITED STATES PATENT OFFICE.

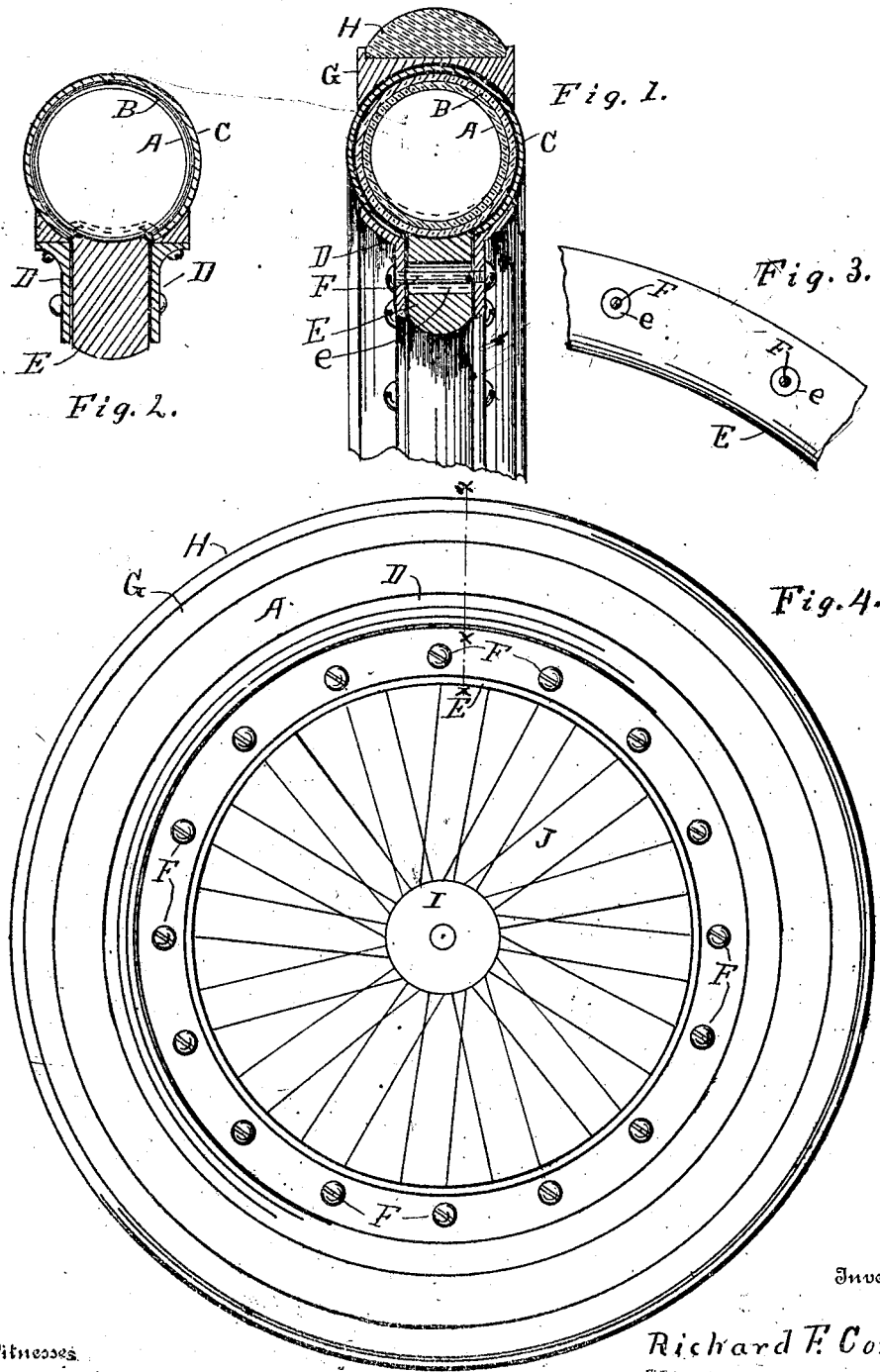

RICHARD F. CORWIN, OF GRAND RAPIDS, MICHIGAN.

VEHICLE-WHEEL.

No. 871,481.   Specification of Letters Patent.   Patented Nov. 19, 1907.

Application filed October 22, 1906. Serial No. 340,103.

*To all whom it may concern:*

Be it known that I, RICHARD F. CORWIN, a citizen of the United States, residing at Grand Rapids, in the county of Kent and State of Michigan, have invented certain new and useful Improvements in Vehicle-Wheels, of which the following is a specification.

My invention relates to improvements in vehicle wheels for use with pneumatic tires for bicycles, automobiles &c, and its objects are: first, to provide a wheel having the resiliency of a pneumatic tire without exposing the pneumatic tire to the direct wear of the road; second, to provide against sidewise expansion of the tire when compressed with weight in the vehicle, and, third, to protect the pneumatic tube from corrosion by contact with the outer atmosphere.

I attain these objects by the mechanism illustrated in the accompanying drawing in which Figure 1 is a transverse section of the tire and rim of the wheel on the line $x\,x$ of Fig. 4; Fig. 2 is the same showing a modified form of securing the outer or steel ring of the tire to the flange; Fig. 3 is a side view of a section of the felly showing relative size of the bolts and the bolt holes, and Fig. 4 is a side elevation of a wheel greatly reduced in diameter but with the rim enlarged to nearly its normal size to show the construction of its several parts.

Similar letters refer to similar parts throughout the several views.

In the construction of this wheel I make use, first of a pneumatic tube, preferably an ordinary single tube tire, as shown at A. Around this tube I place a jacket B of fabric that is so woven that it will stretch considerably, longitudinally, but will not stretch laterally. This casing may be made by interweaving an inelastic woof with an elastic warp, a common process in the weaver's art. By this means the pneumatic tube A may be fully inflated so that it will fill the steel jacket C solidly and no longitudinal strain will be exercised upon the tube A by reason of the labor exercised upon the rim of the wheel when carrying a vehicle.

I incase the tubes A and B in a rigid steel casing C that nearly surrounds the tubes, terminating, near the inner line of the tire with flanges D that project inward and form a groove for the reception of the felly E, which is held in place by bolts F passing through the flanges D and the large hole $e$ in the felly. The object of the hole $e$ being so much larger than the bolt F is to give sufficient movement to the felly to allow it to move to and from the pneumatic tube A, the outer periphery of the felly being in direct contact with the surface of the outer tube or jacket B so that any sudden jolt upon the tire H will cause the felly to press downward upon the tubes A and B, as indicated by the dotted lines in Figs. 1 and 2, and thus give resiliency to the wheel, and as the tubes A and B cannot expand sidewise, by reason of being held firmly to form by the steel casing C, the entire resilience of the wheel must be derived from the action of the felly E upon the narrow surface of the tire that is covered by the felly, and the degree of resilience is governed, first, by the rigidity of the tire, and, second, by the size of the holes $e$ through the felly.

While I prefer the use of the auxiliary felly G and the hard rubber tire H the rim may be used without them, but not with nearly as good results. While the pneumatic tube A will work almost perfectly without this casing, the wear and strain is so much greater upon it that I deem it much more desirable to use it.

I is the hub and J is the spokes of the wheel.

Having thus fully described my invention, what I claim as new and desire to secure by Letters Patent of the United States, is:—

1. In a vehicle wheel, a metallic casing open at the inner periphery and having flanges projecting inward and small bolts passing through them, a felly between said flanges and having large holes therethrough to receive the small bolts, a pneumatic tube within the inclosure formed by the felly and the metallic casing, and an intermediate fabric casing woven of elastic warp and non-elastic woof and placed around the pneumatic tube within the metallic casing.

2. In a vehicle wheel, a metallic casing open at the inner periphery and having inwardly projecting flanges, small bolts through the flanges, a felly between the flanges and having large holes for the free passage of the bolts, a pneumatic tube within the opening formed by the felly and the metallic casing, a fabric casing woven with elastic warp and non-elastic woof and placed around the pneumatic tube within the metallic casing, and a tire around the outer periphery of the metallic casing.

Signed at Grand Rapids Michigan October 17 1906.

RICHARD F. CORWIN.

In presence of—
 WALTER J. KENNEDY,
 I. J. CILLEY.